(12) United States Patent
Wu et al.

(10) Patent No.: US 12,003,996 B2
(45) Date of Patent: Jun. 4, 2024

(54) MEASUREMENT METHOD, INDICATION METHOD, APPARATUS, TERMINAL, NETWORK DEVICE, AND MEDIUM

(71) Applicant: VIVO MOBILE COMMUNICATION CO., LTD., Guangdong (CN)

(72) Inventors: Kai Wu, Dongguan (CN); Xueming Pan, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 482 days.

(21) Appl. No.: 17/316,795

(22) Filed: May 11, 2021

(65) Prior Publication Data

US 2021/0266776 A1 Aug. 26, 2021

Related U.S. Application Data

(63) Continuation of application No. PCT/CN2019/111360, filed on Oct. 16, 2019.

(30) Foreign Application Priority Data

Nov. 12, 2018 (CN) .......................... 201811342013.1

(51) Int. Cl.
*H04W 4/00* (2018.01)
*H04L 5/00* (2006.01)
*H04W 24/08* (2009.01)
*H04W 24/10* (2009.01)
(Continued)

(52) U.S. Cl.
CPC ........... *H04W 24/10* (2013.01); *H04L 5/0048* (2013.01); *H04W 24/08* (2013.01); *H04W 56/001* (2013.01); *H04W 72/23* (2023.01)

(58) Field of Classification Search
CPC ... H04W 24/10; H04W 24/08; H04W 56/001; H04W 72/23; H04W 52/0216; H04W 52/0209; H04W 48/10; H04L 5/0048; H04L 5/006; H04J 11/0069; Y02D 30/70;
(Continued)

(56) References Cited

U.S. PATENT DOCUMENTS 9,509,469 B2 * 11/2016 Cheng ................. H04W 56/001
9,667,396 B2 * 5/2017 Seo ........................ H04W 72/27
11,489,579 B2 * 11/2022 Takeda .................. H04W 72/23
(Continued)

FOREIGN PATENT DOCUMENTS

CN 104144504 A 11/2014
CN 105634708 A 6/2016
(Continued)

OTHER PUBLICATIONS

First Office Action regarding Korean Patent Application No. 10-2021-7015878, dated Aug. 9, 2022. Translation provided by Bohui Intellectual Property.
(Continued)

*Primary Examiner* — Stephen M D Agosta
(74) *Attorney, Agent, or Firm* — Harness, Dickey & Pierce, P.L.C.

(57) ABSTRACT

A measurement method includes: determining a demodulation reference signal (DMRS) of a physical downlink control channel (PDCCH) used for radio resource management (RRM) measurement; and performing RRM measurement according to the DMRS.

17 Claims, 4 Drawing Sheets

(51) Int. Cl.
*H04W 56/00* (2009.01)
*H04W 72/23* (2023.01)

(58) Field of Classification Search
CPC .. H04B 17/373; H04B 17/318; H04B 17/382; H04B 17/309; H04B 17/336
See application file for complete search history.

(56) References Cited

U.S. PATENT DOCUMENTS

| | | | | |
|---|---|---|---|---|
| 2014/0226636 A1* | 8/2014 | Xu | H04W 56/0015 | 370/336 |
| 2015/0023177 A1* | 1/2015 | Xi | H04L 5/0098 | 370/241 |
| 2015/0189627 A1* | 7/2015 | Yang | H04L 5/14 | 370/280 |
| 2015/0230211 A1* | 8/2015 | You | H04L 5/0051 | 370/330 |
| 2015/0271744 A1* | 9/2015 | Liu | H04L 5/005 | 370/329 |
| 2015/0373694 A1* | 12/2015 | You | H04L 5/0051 | 370/329 |
| 2016/0007406 A1* | 1/2016 | Yi | H04W 24/02 | 370/252 |
| 2016/0295634 A1* | 10/2016 | Miao | H04W 76/27 | |
| 2016/0360512 A1* | 12/2016 | Seo | H04L 5/0023 | |
| 2017/0013554 A1* | 1/2017 | Jain | H04W 72/27 | |
| 2017/0078955 A1* | 3/2017 | Cheng | H04W 36/0072 | |
| 2017/0111886 A1* | 4/2017 | Kim | H04W 48/14 | |
| 2018/0048413 A1* | 2/2018 | Liu | H04W 76/27 | |
| 2018/0103474 A1* | 4/2018 | Nurminen | H04W 8/22 | |
| 2018/0132168 A1* | 5/2018 | Ingale | H04W 72/23 | |
| 2018/0167836 A1* | 6/2018 | Axmon | H04W 24/10 | |
| 2018/0198594 A1* | 7/2018 | Tiirola | H04L 5/005 | |
| 2018/0220425 A1 | 8/2018 | Zhang et al. | | |
| 2018/0262313 A1 | 9/2018 | Nam et al. | | |
| 2019/0090251 A1* | 3/2019 | Harada | H04W 24/10 | |
| 2020/0028603 A1* | 1/2020 | Wang | H04L 5/0057 | |
| 2020/0044796 A1 | 2/2020 | Yang et al. | | |
| 2020/0053738 A1* | 2/2020 | Harada | H04B 7/0626 | |
| 2020/0100226 A1* | 3/2020 | Hosseini | H04W 72/044 | |
| 2020/0119874 A1* | 4/2020 | Liu | H04W 72/23 | |
| 2020/0304256 A1* | 9/2020 | Park | H04L 25/03 | |
| 2020/0336193 A1* | 10/2020 | Park | H04W 76/28 | |
| 2020/0344834 A1* | 10/2020 | Harada | H04B 7/088 | |

FOREIGN PATENT DOCUMENTS

| | | |
|---|---|---|
| CN | 107659996 A | 2/2018 |
| CN | 108075868 B | 5/2018 |
| CN | 108289325 A | 7/2018 |
| CN | 108631889 A | 10/2018 |
| WO | WO-2014117395 A1 | 8/2014 |
| WO | WO-2017054633 A1 | 4/2017 |

OTHER PUBLICATIONS

"Discussion on SS periodicity," LG Electronics, 3GPP TSG RAN WG1 Meeting #88bis, R1-1704864, dated Apr. 7, 2017.

International Search Report and Written Opinion of the International Searching Authority regarding International Patent Application No. PCT/CN2019/111360, dated Jan. 2, 2020. Translation provided by Bohui Intellectual Property.

First Office Action regarding Chinese Patent Application No. 201811342013.1, dated Sep. 11, 2020. Translation provided by Bohui Intellectual Property.

Second Office Action regarding Chinese Patent Application No. 201811342013.1, dated Feb. 4, 2021. Translation provided by Bohui Intellectual Property.

"UE power Consumption Reduction in RRM Measurements," OPPO, 3GPP TSG RAN WG1 Meeting #95, R1-1812826, dated Nov. 16, 2018.

Supplementary European Search Report regarding Application No. 19883984.7-1205/3883148; PCT/CN2019/111360, dated Nov. 30, 2021.

3GPP Draft; List of RAN1 Agreements, 3rd Generation Partnership Project (3GPP), RAN1 NR-Adhoc#3, Sep. 2017.

"On UE features," Intel Corporation, 3GPP TSG RAN WG1 Meeting #92, R1-1802440, Mar. 2, 2018.

"Discussions on triggering signaling for UE power saving," LG Electronics, 3GPP TSG RAN WG1 #94-bis, R1-1810308, dated Oct. 12, 2018.

\* cited by examiner

MEASUREMENT METHOD, INDICATION METHOD, APPARATUS, TERMINAL, NETWORK DEVICE, AND MEDIUM

CROSS-REFERENCE OF RELATED APPLICATIONS

This application is a Bypass Continuation Application of PCT/CN2019/111360 filed on Oct. 16, 2019, which claims priority to Chinese Patent Application No. 201811342013.1 filed on Nov. 12, 2018, which are incorporated herein by reference in their entirety.

TECHNICAL FIELD

The present disclosure relates to the field of communications, and in particular, to a measurement method, an indication method, an apparatus, a terminal, a network device, and a medium.

BACKGROUND

User equipment (UE) needs to perform radio resource management (RRM) measurement in an idle state. As specified, the UE needs to perform two RRM measurements within a paging period to calculate and report a measurement value. The time interval between two RRM measurements is half a paging period.

Figure 1:
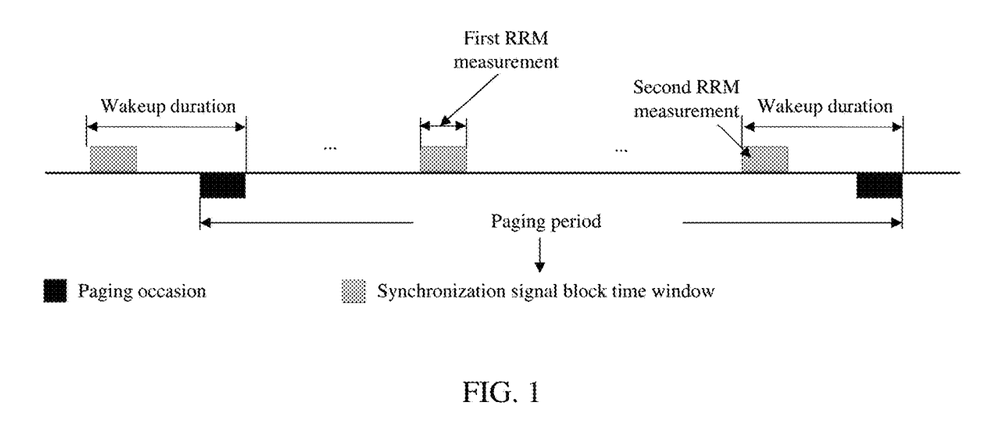
FIG. 1 is a schematic diagram of the principle of performing RRM measurement in the related art.

As shown in FIG. 1, the UE performs two RRM measurements in a paging period according to a synchronization signal block (SSB). The UE needs to be woken up during the first RRM measurement, and the UE also needs to be woken up during the second RRM measurement. After the UE is woken up this time, the UE remains a wakeup state until it performs paging monitoring, and enters a sleep state when the paging monitoring ends.

It can be seen that the UE has to be woken up at least twice in a paging period, resulting in high power consumption of the UE.

SUMMARY

According to a first aspect, an embodiment of this disclosure provides a measurement method for radio resource management, applied to a terminal. The method includes:
  determining a demodulation reference signal DMRS of a physical downlink control channel PDCCH used for radio resource management RRM measurement; and
  performing RRM measurement according to the DMRS.

According to a second aspect, an embodiment of the present disclosure provides an indication method for a measurement resource, applied to a network. The method includes:
  indicating a DMRS of a PDCCH used for RRM measurement by a terminal.

According to a third aspect, an embodiment of this disclosure provides a measurement apparatus for radio resource management, applied to a terminal. The apparatus includes:
  a determining module, configured to determine a demodulation reference signal DMRS of a physical downlink control channel PDCCH used for radio resource management RRM measurement; and
  a measurement module, configured to perform RRM measurement according to the DMRS.

According to a fourth aspect, an embodiment of the present disclosure provides an indication apparatus for a measurement resource, applied to a network. The apparatus includes:
  an indication module, configured to indicate a DMRS of a PDCCH used for RRM measurement by a terminal.

According to a fifth aspect, an embodiment of the present disclosure provides a terminal. The terminal includes: a processor and a memory storing computer program instructions; where
  when the processor executes the computer program instructions, the measurement method for the radio resource management is implemented.

According to a sixth aspect, an embodiment of the present disclosure provides a network device. The network device includes: a processor and a memory storing computer program instructions; where
  when the processor executes the computer program instructions, the indication method for a measurement resource is implemented.

According to a seventh aspect, an embodiment of the present disclosure provides a non-transitory computer-readable storage medium. The non-transitory computer-readable storage medium stores a computer program instruction, and when the computer program instruction is executed by a processor, the measurement method for radio resource management or the indication method for a measurement resource is implemented.

BRIEF DESCRIPTION OF DRAWINGS

To describe the technical solutions of the embodiments of the present disclosure more clearly, the following briefly describes the accompanying drawings required for describing the embodiments of the present disclosure. A person of ordinary skill in the art may still derive other drawings from these accompanying drawings.

DETAILED DESCRIPTION OF EMBODIMENTS

The features and exemplary embodiments of each aspect of the present disclosure will be described below in detail. To make the objectives, technical solutions, and advantages of the present disclosure more clearly, the following further describes the present disclosure in detail with reference to the accompanying drawings and embodiments. It should be understood that the specific embodiments described herein are only configured to explain the present disclosure, but are not configured to limit the present disclosure. For a person skilled in the art, the present disclosure may be implemented without some of these specific details. The following description of the embodiments is only to provide a better understanding of the present disclosure by showing examples of the present disclosure.

It should be noted that in this specification, relational terms such as first and second are used only to differentiate an entity or operation from another entity or operation, and do not require or imply that any actual relationship or sequence exists between these entities or operations. In addition, the terms "comprise", "include" and any other variants thereof are intended to cover non-exclusive inclusion, so that a process, a method, an article, or a device that includes a series of elements not only includes these very elements, but may also include other elements not expressly listed, or also include elements inherent to this process, method, article, or device Without being subject to further limitations, an element defined by a phrase "including" does not exclude presence of other identical elements in the process, method, article, or device that includes the very element.

Embodiments of the present disclosure provide a measurement method, an indication method, an apparatus, a terminal, a network device, and a medium. The following first introduces the measurement method provided in the embodiments of the present disclosure.

Figure 2:
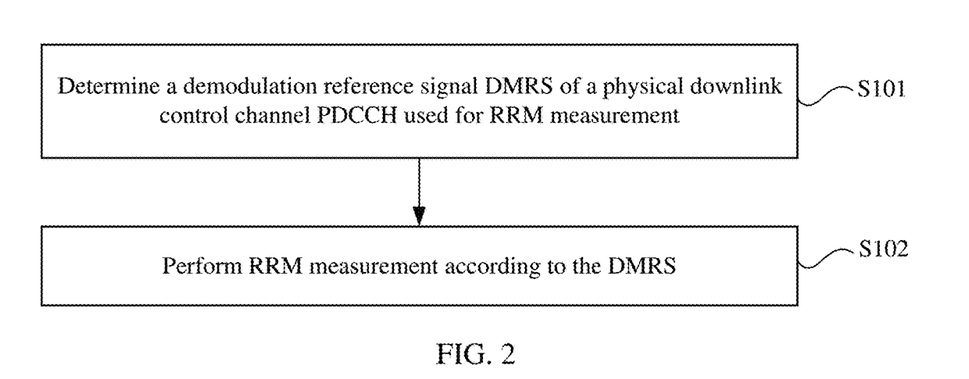
FIG. 2 is a schematic flowchart of a measurement method for radio resource management according to an embodiment of the present disclosure.

FIG. 2 is a schematic flowchart of a measurement method for radio resource management according to an embodiment of the present disclosure. As shown in FIG. 2, the measurement method includes:

S101: determining a demodulation reference signal (DMRS) of a physical downlink control channel (PDCCH) used for RRM measurement; and S102: performing RRM measurement according to the DMRS.

It should be noted that a measured quantity obtained by perform RRM measurement according to the DMRS can include one or a combination of the following: reference signal received power (RSRP), reference signal received quality (RSRQ), a received signal strength indicator (RSSI), and a signal to interference plus noise ratio (SINR).

As an example, the bandwidth of the PDCCH of the DMRS for performing RRM measurement is greater than the bandwidth of the SSB for performing RRM measurement.

Optionally, a value obtained by dividing the bandwidth of the PDCCH of the DMRS for performing RRM measurement by the bandwidth of the SSB for performing RRM measurement is greater than or equal to 2.

For example, the bandwidth of the SSB for performing RRM measurement is 20 RB, and the bandwidth of the PDCCH is 40 RB. Performing one RRM measurement according to the DMRS of the PDCCH is equivalent to performing two RRM measurements according to the SSB. In this way, one RRM measurement can be performed according to the DMRS of the PDCCH in a paging period.

According to the measurement method for radio resource management in the embodiments of the present disclosure, RRM measurement according to the DMRS of the PDCCH is different from RRM measurement according to the SSB. Since the PDCCH can cover a larger bandwidth and the bandwidth of the PDCCH is wider than that of the SSB, one RRM measurement according to the DMRS of the PDCCH may be equivalent to multiple RRM measurements according to the SSB. Therefore, this can reduce the number of RRM measurements in one paging period, thereby reducing power consumption of RRM measurement. This also reduces the number of times the terminal is woken up due to RRM measurement, further reducing power consumption of the UE. Moreover, the combination of RRM measurement and PDCCH monitoring reduces the number of RRM measurements and can reduce the overall complexity.

In an embodiment of the present disclosure, the measurement method further includes:

performing RRM measurement according to a synchronization signal block SSB; and obtaining a to-be-reported RRM measurement result according to two RRM measurement results, where the two RRM measurement results are: a measurement result obtained by performing RRM measurement according to the DMRS and a measurement result obtained by performing RRM measurement according to the SSB.

It should be noted that the SSB includes a primary synchronization signal (PSS), a secondary synchronization signal (SSS), a physical broadcast channel (PBCH), and a PBCH DMRS, and occupies 20 resource blocks RB) and 4 orthogonal frequency division multiplexing (OFDM) symbols. That is, an SS/PBCH block is an SSB.

The measured quantity of RRM measurement according to the SSB includes one or a combination of the following: RSRP, RSRQ, an RSSI, and an SINR.

When a to-be-reported RRM measurement result is obtained, the RRM measurement result is reported to the higher layer. The higher layer is layer 3, and after filtering at layer 3, the corresponding mobility behavior is implemented based on a filtered result.

According to the measurement method for radio resource management in the embodiments of the present disclosure, RRM measurement in multiple ways can obtain higher measurement precision. In addition, RRM measurement may be performed separately according to the DMRS of the PDCCH and the SSB when the terminal wakes up once, to avoid waking up the terminal for multiple times.

As an example, the to-be-reported RRM measurement result is calculated according to a ratio between power of the SSB and power of a resource element RE of the DMRS and the two RRM measurement results.

It should be noted that RRM measurement can be performed based on the SSB in the idle state of the terminal.

During calculation of the to-be-reported RRM measurement result, linear averaging is performed according to the power scaling ratio on the RE of the DMRS, to obtain the to-be-reported RRM measurement result.

For example, the to-be-reported RRM measurement result is calculated by using the following formula:

$$Z = a/(a+b) \times X1 + b/(a+b) \times X2 \qquad \text{formula 1; and}$$

$$P1/P2 = b/a \qquad = \text{formula 2.}$$

Z represents the to-be-reported RRM measurement result, X1 represents the measurement result obtained by performing RRM measurement according to the DMRS, X2 represents the PE average power for performing RRM measurement according to the SSB, a and b are constants, P1 represents the average power of the resource element RE of the DMRS, and P2 represents the power of the SSB for performing RRM measurement.

For example, RSRP1 is obtained by performing RRM measurement according to DMRS, RSRP2 is obtained by performing RRM measurement according to the SSB, RSRP1 is used as X1 in formula 1, RSRP2 is used as X2 in formula 1, and to-be-reported RSRP is obtained through formula 1.

In an embodiment of the present disclosure, the SSB for performing RRM measurement includes: an SSB included in a time window indicated by a synchronization signal block measurement timing configuration (SMTC) or an SSB actually transmitted in a serving cell; or the SSB for performing RRM measurement includes: a union set of an SSB included in a time window indicated by an SMTC and an SSB actually transmitted in a serving cell; or the SSB for performing RRM measurement includes: an intersection set of an SSB included in a time window indicated by an SMTC and an SSB actually transmitted in a serving cell.

For example, system information is used in the network to indicate the SMTC and the SSB actually transmitted in the serving cell. The terminal performs RRM measurement according to the union set or the intersection set of the SSB actually transmitted in a serving cell and the SSB included in the time window indicated by the SMTC.

In an embodiment of the present disclosure, the DMRS for performing RRM measurement and the SSB for performing RRM measurement are quasi-co-located (QCL).

Quasi-co-location parameters of the DMRS and the SSB include one or a combination of the following: Doppler shift, Doppler broadening, average delay, delay spread, spatial Rx parameter, and average gain.

For example, the type of QCL parameters of the DMRS and the SSB is type-D, that is, spatial Rx parameters of the DMRS and the SSB are quasi co-located.

In an embodiment of the present disclosure, the DMRS for performing RRM measurement includes: a DMRS of a paging PDCCH monitored by the terminal and/or a DMRS of a PDCCH for scheduling system information; or the DMRS for performing RRM measurement includes: a DMRS of a PDCCH that higher layer signaling instructs to monitor.

It should be noted that the DMRS for performing RRM measurement can include: the DMRS of the PDCCH that needs to be monitored in the idle state.

The higher layer signaling above may be system information from the network.

In a new radio (NR) access technology system, the network indicates system information update by using the paging PDCCH. If the paging message indicates system information update, the terminal needs to receive new system information in a next modification period. System information transmitted in the current modification period is still system information before the update. That is, the receiving of the updated system information has a maximum delay of the length of the modification period.

Paging has two functions, one function is to page the terminal in the idle state, and the other function is to indicate system information update/warning information. When a user is paged, scheduling information and a physical downlink shared channel (PDSCH) resource that are indicated by the paging PDCCH are used to indicate the ID of the paged UE. If no user is paged and system information/warning information needs to be updated, the paging PDCCH does not indicate PDSCH transmission.

The moment when the UE monitors the paging PDCCH is called a paging occasion (PO). If RRM measurement is performed according to the DMRS of the paging PDCCH, since the RRM measurement and the PO are on the same time resource, the number of wakeup times is reduced by one, thereby reducing power consumption of the terminal.

In an embodiment of the present disclosure, the DMRS used for the RRM measurement is determined according to the higher layer signaling.

As an example, the higher layer signaling includes an indication of an SMTC used for RRM measurement, and the DMRS for performing the RRM measurement includes: a DMRS of a PDCCH associated with the SSB included in the time window indicated by the SMTC.

As an example, the higher layer signaling includes an indication of the SSB actually transmitted in the serving cell, and the DMRS for performing the RRM measurement includes: a DMRS of a PDCCH associated with the SSB actually transmitted in the serving cell.

For example, system information is used in the network to indicate the SMTC for RRM measurement and the SSB actually transmitted in the serving cell. The terminal performs RRM measurement according to at least one of the following two manners.

1. The terminal performs RRM measurement according to the paging PDCCH associated with the SSB included in the time window indicated by the SMTC.

2. The terminal performs RRM measurement according to the paging PDCCH associated with the SSB actually transmitted in a serving cell.

In an embodiment of the present disclosure, according to the higher layer signaling, it is determined whether a DMRS of a PDCCH in a control resource set (CORESET) is a wideband DMRS; and the wideband DMRS is used as the DMRS for performing RRM measurement.

For example, the network instructs the terminal to monitor whether the DMRS of the PDCCH for monitoring the CORESET of the paging PDCCH is a wide band DMRS, and if it is the wideband DMRS, it indicates that the terminal can perform RRM measurement according to the DMRS of the PDCCH.

The wideband DMRS is mapped to a resource element group of consecutive resource blocks in the CORESET, and a precoding granularity of the CORESET is the same as the number of resource blocks included in the CORESET.

In an embodiment of the present disclosure, the method further includes: according to the higher layer signaling, determining whether the terminal is allowed to perform RRM measurement according to the DMRS of the PDCCH.

For example, the system information is used in the network to indicate whether the terminal is allowed to use the DMRS of the paging PDCCH to perform RRM measurement.

In an embodiment of the present disclosure, the RRM measurement mentioned above is used for at least one of intra-frequency measurement, inter-frequency measurement, inter-RAT measurement, serving cell measurement, and camped cell measurement.

For example, the above RRM measurement is used for serving cell measurement and camped cell measurement.

Figure 3:
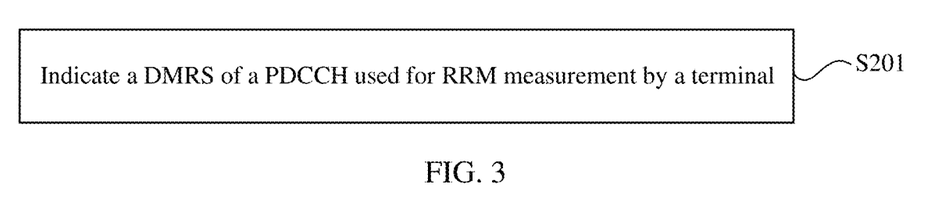
FIG. 3 is a schematic flowchart of an indication method for a measurement resource according to an embodiment of the present disclosure.

FIG. 3 is a schematic flowchart of an indication method for a measurement resource according to an embodiment of the present disclosure. The indication method is applied to a network, and the indication method includes:

S201: Indicate a DMRS of a PDCCH used for RRM measurement by a terminal.

In an embodiment of the present disclosure, a DMRS of a PDCCH used for RRM measurement by a terminal is indicated by using higher layer signaling.

The higher layer signaling is sent to the terminal, and the higher layer signaling is used to instruct the terminal to determine the DMRS of the PDCCH for RRM measurement.

According to the indication method for a measurement resource in the embodiments of the present disclosure, the higher layer signaling instructs the terminal to determine the DMRS of the PDCCH for RRM measurement, so that the terminal can perform RRM measurement according to the DMRS of the PDCCH. Since the PDCCH can cover a larger bandwidth and the bandwidth of the PDCCH is wider than that of the SSB, one RRM measurement according to the DMRS of the PDCCH may be equivalent to multiple RRM measurements according to the SSB. Therefore, this can reduce the number of RRM measurements in one paging period, thereby reducing power consumption of RRM measurement. This also reduces the number of times the terminal is woken up due to RRM measurement, further reducing power consumption of the UE. Moreover, the combination of RRM measurement and PDCCH monitoring reduces the number of RRM measurements and can reduce the overall complexity.

In an embodiment of the present disclosure, the indication method further includes:
  indicating whether to allow the terminal to perform RRM measurement according to the DMRS of the PDCCH;
    or indicating whether a DMRS on which the terminal is to perform RRM measurement is a wideband DMRS.

As an example, whether to allow the terminal to perform RRM measurement according to the DMRS of the PDCCH is indicated by using the higher layer signaling.

For example, the higher layer signaling is used in the network to indicate whether to allow the terminal to perform RRM measurement according to the DMRS of the PDCCH. If the network side instructs the terminal to perform RRM measurement according to the DMRS of the PDCCH, the DMRS is considered to be the wideband DMRS, and the terminal can perform RRM measurement according to the wideband DMRS.

As an example, whether a DMRS on which the terminal is to perform RRM measurement is a wideband DMRS is indicated by using the higher layer signaling.

For example, the network side indicates whether the DMRS of the PDCCH is the wideband DMRS by using the higher layer signaling, and if the network side indicates that the DMRS of the PDCCH is the wideband DMRS, the terminal can perform measurement based on the wideband DMRS.

It should be noted that the higher layer signaling that indicates whether the terminal is allowed to perform RRM measurement according to the DMRS of the PDCCH and the higher layer signaling that indicates the DMRS used by the terminal to perform RRM measurement can be the same higher layer signaling. Alternatively, the higher layer signaling that indicates whether a DMRS on which the terminal is to perform RRM measurement is a wideband DMRS and the higher layer signaling that indicates the DMRS used by the terminal to perform RRM measurement can be the same higher layer signaling.

The higher layer signaling includes an indication of an SMTC used for RRM measurement, and a PDCCH of the DMRS for performing the RRM measurement by the terminal includes: a PDCCH associated with the SSB included in the time window indicated by the SMTC.

The higher layer signaling includes an indication of the SSB actually transmitted in the serving cell, and a PDCCH of the DMRS for performing the RRM measurement by the terminal includes: a PDCCH associated with the SSB actually transmitted in the serving cell.

In an embodiment of the present disclosure, the DMRS for performing RRM measurement includes: a DMRS of a paging PDCCH and/or a DMRS of a PDCCH for scheduling system information; or the DMRS for performing RRM measurement includes: a DMRS of a PDCCH that higher layer signaling instructs to monitor.

It should be noted that the DMRS for performing RRM measurement can include: the DMRS of the PDCCH that needs to be monitored in the idle state.

It should be noted that the higher layer signaling above may be system information.

Figure 4:
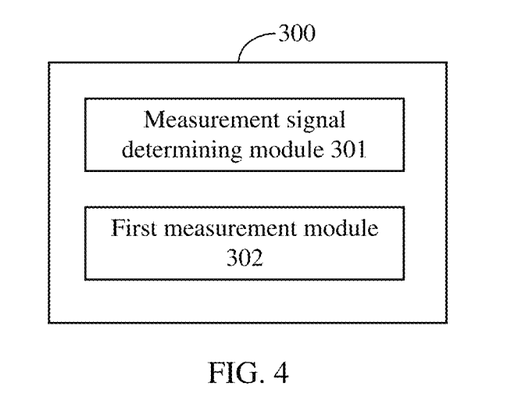
FIG. 4 is a schematic structural diagram of a measurement apparatus for radio resource management according to an embodiment of the present disclosure.

FIG. 4 is a schematic structural diagram of a measurement apparatus for radio resource management according to an embodiment of the present disclosure. The measurement apparatus is applied to a terminal, and the measurement apparatus 300 includes:
  a measurement signal determining module 301, configured to determine a demodulation reference signal DMRS of a physical downlink control channel PDCCH used for radio resource management RRM measurement; and
  a first measurement module 302, configured to perform RRM measurement according to the DMRS.

In an embodiment of the present disclosure, the measurement apparatus 300 further includes:
  a second measurement module, configured to perform RRM measurement according to a synchronization signal block SSB; and
  a to-be-reported measurement result determining module, configured to obtain a to-be-reported RRM measurement result according to two RRM measurement results, where the two RRM measurement results are: a measurement result obtained by performing RRM measurement according to the DMRS and a measurement result obtained by performing RRM measurement according to the SSB.

In an embodiment of the present disclosure, the to-be-reported measurement result determining module includes:
  a to-be-reported measurement result calculation module, configured to calculate the to-be-reported RRM measurement result according to a ratio between power of the SSB and power of a resource element RE of the DMRS and the two RRM measurement results.

In an embodiment of the present disclosure, the SSB includes: an SSB included in a time window indicated by a synchronization signal block measurement timing configuration SMTC or an SSB actually transmitted in a serving cell; or the SSB includes: a union set of an SSB included in a time window indicated by an SMTC and an SSB actually transmitted in a serving cell; or the SSB includes: an intersection set of an SSB included in a time window indicated by an SMTC and an SSB actually transmitted in a serving cell.

In an embodiment of the present disclosure, the DMRS for performing the RRM measurement and the SSB for performing the RRM measurement are quasi-co-located QCL.

In an embodiment of the present disclosure, the DMRS for performing RRM measurement includes: a DMRS of a paging PDCCH monitored by the terminal and/or a DMRS of a PDCCH for scheduling system information; or the DMRS for performing RRM measurement includes: a DMRS of a PDCCH that higher layer signaling instructs to monitor.

In an embodiment of the present disclosure, the measurement signal determining module 301 is configured to:
  according to the higher layer signaling, determine the DMRS used for the RRM measurement.

In an embodiment of the present disclosure, the higher layer signaling includes an indication of an SMTC used for RRM measurement, and the DMRS for performing the RRM measurement includes: a DMRS of a PDCCH associated with the SSB included in the time window indicated by the SMTC; and/or the higher layer signaling includes an indication of the SSB actually transmitted in the serving cell, and the DMRS for performing the RRM measurement includes: a DMRS of a PDCCH associated with the SSB actually transmitted in the serving cell.

In an embodiment of the present disclosure, the measurement apparatus 300 further includes:
a wideband DMRS determining module, configured to determine whether a DMRS for monitoring a PDCCH in a control resource set CORESET is a wideband DMRS according to the higher layer signaling; and use the wideband DMRS as the DMRS for performing the RRM measurement.

In an embodiment of the present disclosure, the measurement apparatus 300 further includes:
a measurement allowing determining module, configured to: according to the higher layer signaling, determine whether to allow the terminal to perform RRM measurement according to the DMRS of the PDCCH.

In an embodiment of the present disclosure, the RRM measurement is used for at least one of intra-frequency measurement, inter-frequency measurement, inter-RAT measurement, serving cell measurement, and camped cell measurement.

Figure 5:
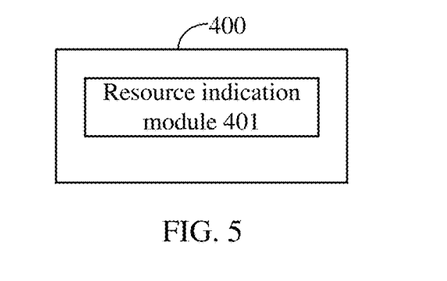
FIG. 5 is a schematic structural diagram of an indication apparatus for a measurement resource according to an embodiment of the present disclosure.

FIG. 5 is a schematic structural diagram of an indication apparatus for a measurement resource according to an embodiment of the present disclosure. The indication apparatus is applied to a network, and the indication apparatus 400 includes:
a resource indication module 401, configured to indicate a DMRS of a PDCCH used for RRM measurement by a terminal.

In an embodiment of the present disclosure, the resource indication module 401 includes:
a signaling indication module, configured to indicate, by using higher layer signaling, a DMRS of a PDCCH used for RRM measurement by a terminal.

In an embodiment of the present disclosure, the indication apparatus 400 further includes:
a measurement indication module, configured to indicate whether to allow the terminal to perform RRM measurement according to the DMRS of the PDCCH; or indicate whether a DMRS on which the terminal is to perform RRM measurement is a wideband DMRS.

In an embodiment of the present disclosure, the measurement indication module is configured to:
indicate, by using higher layer signaling, whether to allow the terminal to perform RRM measurement according to the DMRS of the PDCCH; or indicate, by using higher layer signaling, whether a DMRS on which the terminal is to perform RRM measurement is a wideband DMRS.

Figure 6:
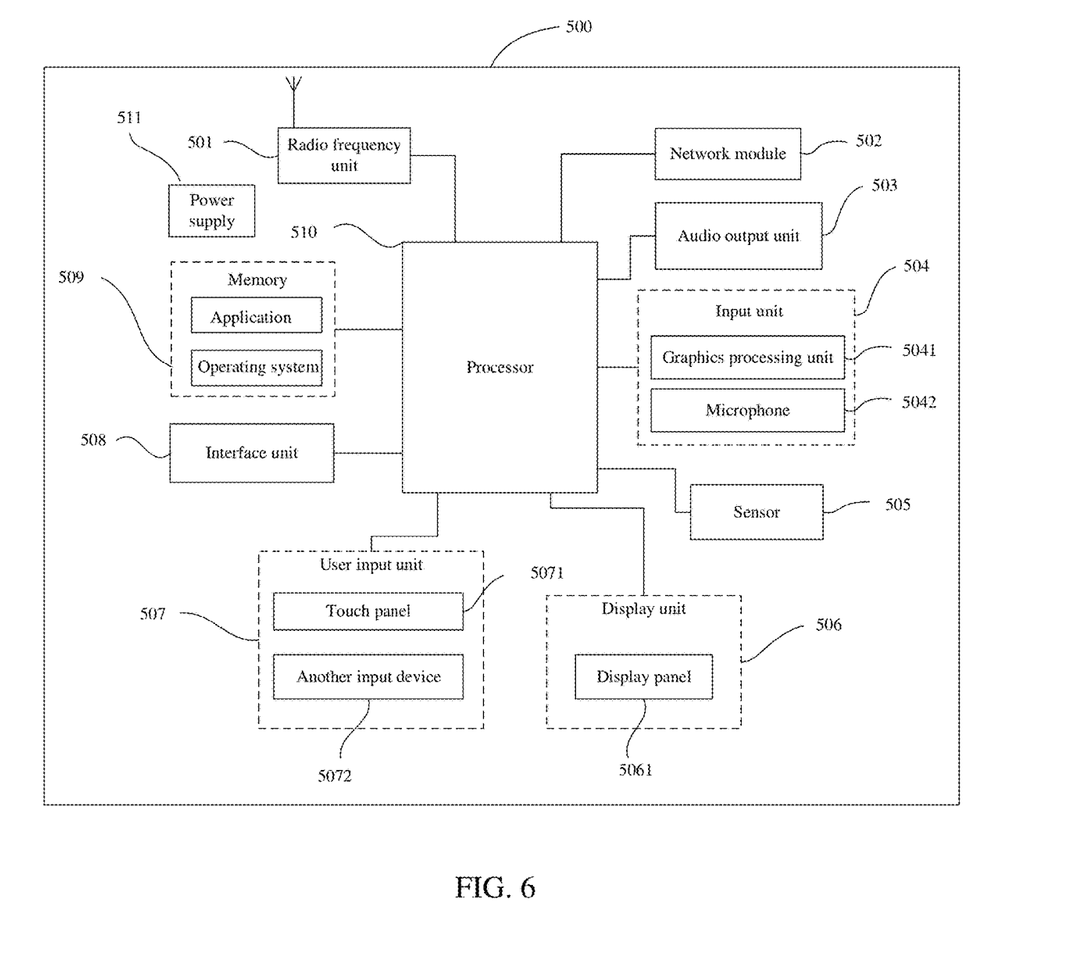
FIG. 6 is a schematic structural diagram of hardware of a terminal according to an embodiment of the present disclosure.

FIG. 6 is a schematic structural diagram of hardware of a terminal according to an embodiment of the present disclosure.

The terminal 500 includes, but is not limited to: a radio frequency unit 501, a network module 502, an audio output unit 503, an input unit 504, a sensor 505, a display unit 506, a user input unit 507, an interface unit 508, a memory 509, a processor 510 and a power supply 511. A person skilled in the art may understand that the structure of the terminal shown in FIG. 6 does not constitute a limitation to the terminal. The terminal may include more or fewer components than that shown in the figure, or a combination of some components, or an arrangement of different components. In this embodiment of the present disclosure, the terminal includes but is not limited to a mobile phone, a tablet computer, a notebook computer, a palmtop computer, a vehicle-mounted terminal, a wearable device, a pedometer, or the like.

The processor 510 is configured to:
determine a demodulation reference signal DMRS of a physical downlink control channel PDCCH used for radio resource management RRM measurement; and
perform RRM measurement according to the DMRS.

RRM measurement is performed on the DMRS of the PDCCH. Since the PDCCH can cover a larger bandwidth, the number of RRM measurements can be reduced, thereby reducing power consumption of RRM measurement. This also reduces the number of times the UE is woken up due to RRM measurement, further reducing power consumption of the terminal.

It should be understood that in the embodiments of the present disclosure, the radio frequency unit 501 can be configured to receive and send information or receive and send signal during calls. For example, the radio frequency unit 501 receives downlink data from a base station, and transmits the downlink data to the processor 510 for processing. In addition, the radio frequency unit 501 sends uplink data to the base station. Generally, the radio frequency unit 501 includes but is not limited to an antenna, at least one amplifier, a transceiver, a coupler, a low noise amplifier, a duplexer, and the like. In addition, the radio frequency unit 501 may further communicate with another device by using a wireless communication system and network.

The terminal provides a user with wireless broadband Internet access through the network module 502, for example, helps the user send and receive emails, browse web pages, and access streaming media.

The audio output unit 503 may convert audio data received by the radio frequency unit 501 or the network module 502 or stored in the memory 509 into an audio signal and output as sound. Moreover, the audio output unit 503 may further provide audio output (for example, call signal receiving sound and message receiving sound) related to a specific function performed by the terminal 500. The audio output unit 503 includes a loudspeaker, a buzzer, a receiver, and the like.

The input unit 504 is configured to receive audio or video signals. The input unit 504 may include a graphics processing unit (GPU) 5041 and a microphone 5042. The graphics processing unit 5041 processes image data of a static image or a video obtained by an image capturing apparatus (such as, a camera) in a video capturing mode or an image capturing mode. A processed image frame may be displayed on the display unit 506. The image frame processed by the graphics processing unit 5041 can be stored in the memory 509 (or another storage medium) or sent via the radio frequency unit 501 or the network module 502. The microphone 5042 may receive sound and can process such sound into audio data. The processed audio data may be converted, in a call mode, into a format that can be sent by the radio frequency unit 501 to a mobile communication base station for output.

The terminal 500 further includes at least one sensor 505, such as an optional sensor, a motion sensor, and another sensor. For example, the light sensor includes an ambient light sensor and a proximity sensor, where the ambient light sensor can adjust brightness of the display panel 5061 based on brightness of ambient light, and the proximity sensor can turn off the display panel 5061 and/or backlight when the terminal 500 moves towards the ear. As a type of the motion sensor, an accelerometer sensor may detect magnitude of an acceleration in each direction (generally three axes), and may detect magnitude and a direction of gravity when being static. The accelerometer sensor may be used for recognizing a terminal gesture (for example, horizontal and vertical screen switching, a related game, or magnetometer posture calibration), a function related to vibration recognition (for example, a pedometer or a strike), or the like. The sensor 505 may further include a fingerprint sensor, a pressure sensor, an iris sensor, a molecular sensor, a gyroscope, a barometer, a hygrometer, a thermometer, an infrared sensor, and the like. This is not described herein.

The display unit 506 is configured to display information entered by the user or information provided for the user. The display unit 506 may include the display panel 5061, and the display panel 5061 may be configured in a form of a liquid crystal display (LCD), an organic light-emitting diode (OLED), or the like.

The user input unit 507 can be configured to receive input numeric or character information, and generate key signal inputs related to user settings and function control of the terminal. For example, the user input unit 507 includes a touch panel 5071 and other input devices 5072. The touch panel 5071, also referred to as a touchscreen, may collect a touch operation performed by the user on or near the touch panel 5071 (for example, an operation performed by the user on or near the touch panel 5071 by using any suitable object or accessory such as a finger or a stylus). The touch panel 5071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, sends the contact coordinates to the processor 510, and receives and executes a command sent by the processor 510. In addition, the touch panel 5071 may be implemented by using a plurality of types such as a resistive type, a capacitive type, an infrared ray, and a surface acoustic wave. The user input unit 507 may include another input device 5072 in addition to the touch panel 5071. For example, the another input device 5072 may include, but is not limited to, a physical keyboard, function keys (such as a volume control key and a switch key), a trackball, a mouse, and a joystick. Details are not described herein.

Further, the touch panel 5071 may cover the display panel 5061. When the touch panel 5071 detects touch operations thereon or nearby, the touch panel 5071 transmits the touch operations to the processor 510 to determine a type of a touch event. Subsequently, the processor 510 provides corresponding visual output on the display panel 5061 according to the type of the touch event. Although in FIG. 6, the touch panel 5071 and the display panel 5061 implement input and output functions of the terminal as two independent components, in some embodiments, the touch panel 5071 and the display panel 5061 may be integrated to implement the input and output functions of the terminal. This is not specifically limited herein.

The interface unit 508 is an interface connecting an external apparatus to the terminal 500. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, and a headset port. The interface unit 508 can be configured to receive an input (for example, data information and power) from the external apparatus and transmit the received input to one or more elements in the terminal 500, or transmit data between the terminal 500 and the external apparatus.

The memory 509 may be configured to store a software program and various data. The memory 509 may mainly include a program storage area and a data storage area. The program storage area may store an operating system, an application program required by at least one function (such as a sound play function or an image play function), and the like. The data storage area may store data (such as audio data or an address book) or the like created based on use of the mobile phone. In addition, the memory 509 may include a high-speed random access memory, or may include a non-volatile memory, for example, at least one disk storage device, a flash memory, or another volatile solid-state storage device.

The processor 510 is a control center of the terminal, and connects all parts of the entire terminal by using various interfaces and lines. By running or executing a software program and/or a module stored in the memory 509 and invoking data stored in the memory 509, the processor 510 performs various functions of the terminal and data processing, to perform overall monitoring on the terminal. The processor 510 may include one or more processing units. Optionally, the processor 510 may be integrated with an application processor and a modem processor. The application processor mainly processes the operating system, the user interface, application programs, and the like. The modem processor mainly processes wireless communication. It may be understood that alternatively, the modem processor may not be integrated into the processor 510.

The terminal 500 may also include a power supply 511 (for example, a battery) that supplies power to various components. Optionally, the power supply 511 may be logically connected to the processor 510 through a power supply management system, to perform functions of managing charging, discharging, and power consumption through the power supply management system.

In addition, the terminal 500 includes some functional modules not shown. Details are not described herein again.

Optionally, an embodiment of the present disclosure further provides a terminal, including: a processor, a memory, and a computer program stored in the memory and executable on the processor. The computer program, when executed by the processor, implements processes in the embodiment of the measurement method for radio resource management, and the same technical effect can be achieved. To avoid repetition, details are not described herein again.

An embodiment of the present disclosure further provides a non-transitory computer-readable storage medium. A computer program is stored in the non-transitory computer-readable storage medium. When being executed by a processor, the computer program implements each process of the foregoing embodiment of the measurement method for radio resource management, and a same technical effect can be achieved. To avoid repetition, details are not described herein. The non-transitory computer-readable storage medium is, for example, a read-only memory (ROM), a random access memory (RAM), a magnetic disk, or an optical disc.

Figure 7:
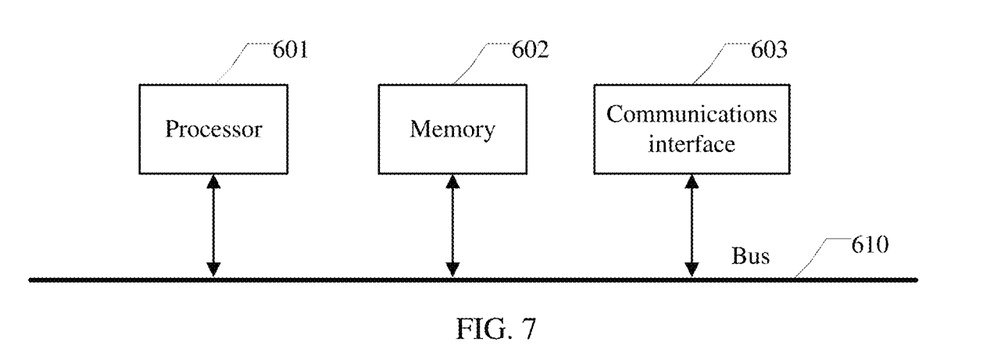
FIG. 7 is a schematic structural diagram of hardware of a network device according to an embodiment of the present disclosure.

FIG. 7 is a schematic structural diagram of hardware of a network device according to an embodiment of the present disclosure.

The network device may include: a processor 601 and a memory 602 storing computer program instructions.

For example, the processor 601 may include a central processing unit (CPU), or an application-specific integrated circuit (ASIC), or may be one or more integrated circuits configured to implement the embodiments of the present disclosure.

The memory 602 may include a massive storage for data or instructions. For example and not limitation, the memory 602 may include a hard disk drive (HDD), a floppy disk drive, a flash memory, an optical disk, a magneto-optical disk, a magnetic tape, a universal serial bus (USB) drive, or a combination of two or more of the foregoing. In an appropriate case, the memory 602 may include a removable or non-removable (or fixed) medium. In an appropriate case, the memory 602 may be inside or outside a comprehensive gateway disaster recovery device. In a particular embodiment, the memory 602 is a non-volatile solid-state memory. In a particular embodiment, the memory 602 includes a read-only memory (ROM). In an appropriate case, the ROM can be a mask-programmed ROM, a programmable ROM (PROM), an erasable PROM (EPROM), an electrically erasable PROM (EEPROM), an electrically rewritable ROM (EAROM), a flash memory, or a combination of two or more of these.

The processor 601 reads and executes the computer program instructions stored in the memory 602 to implement any one of the indication methods for a measurement resource in the foregoing embodiments.

In an example, the network device may further include a communication interface 603 and a bus 610. As shown in FIG. 7, the processor 601, the memory 602, and the communication interface 603 are connected through a bus 610 and complete communication with each other.

The communication interface 603 is mainly configured to implement communication between various modules, apparatuses, units and/or devices in the embodiments of the present disclosure.

The bus 610 includes hardware, software, or both, and couples the components of the network device to each other.

By way of example and not limitation, the bus may include an accelerated graphics port (AGP) or other graphics buses, an enhanced industry standard architecture (EISA) bus, a front side bus (FSB), a hypertransport (HT) interconnect bus, an industry standard architecture (ISA) bus, an infinite bandwidth Interconnect bus, a low pin count (LPC) bus, a memory bus, a micro channel architecture (MCA) bus, a peripheral component interconnect (PCI) bus, a PCI-Express (PCI-X) bus, a serial advanced technology attachment (SATA) bus, a video electronics standards association local (VLB) bus, other suitable buses, or a combination of two or more of the foregoing. In an appropriate case, the bus 610 may include one or more buses. Although in the embodiments of the present disclosure, a specific bus is described, in the present disclosure, any suitable bus or interconnection is considered.

The network device can execute the indication method for a measurement resource in the embodiments of the present disclosure, thereby implementing the indication method and apparatus for a measurement resource described with reference to FIG. 3 and FIG. 5.

In addition, in combination with the indication method for a measurement resource in the foregoing embodiments, the embodiments of the present disclosure may provide a non-transitory computer-readable storage medium for implementation. The non-transitory computer-readable storage medium stores a computer program instruction, and when the computer program instruction is executed by the processor, any one of the indication methods for a measurement resource in the foregoing embodiments is performed.

It should be clear that the present disclosure is not limited to the specific configuration and processing described above and shown in the figures. For brevity, a detailed description of a known method is omitted herein. In the foregoing embodiments, a plurality of specific steps are described and shown as examples. However, the method process in the present disclosure is not limited to the specific steps described and shown, and a person skilled in the art can make various changes, modifications and additions, or change the sequence between the steps after understanding the spirit of the present disclosure.

The functional blocks shown in the above-mentioned structural block diagram may be implemented as hardware, software, firmware, or a combination thereof. When the functional blocks are implemented as hardware, the functional blocks can be, for example, an electronic circuit, an application specific integrated circuit (ASIC), appropriate firmware, a plug-in, or a function card. When the functional blocks are implemented as software, the elements of the present disclosure are programs or code segments used to perform required tasks. The program or code segment may be stored in a machine-readable medium, or transmitted on a transmission medium or a communication link through a data signal carried in a carrier wave. "Machine-readable medium" may include any medium that can store or transmit information. Examples of machine-readable media include an electronic circuit, a semiconductor memory device, a ROM, a flash memory, an erasable ROM (EROM), a floppy disk, a CD-ROM, an optical disk, a hard disk, a fiber optic medium, a radio frequency (RF) link, and so on. The code segment can be downloaded via a computer network such as the Internet, intranet, and so on.

It should also be noted that in the exemplary embodiments mentioned in the present disclosure, some methods or systems are described based on a series of steps or apparatuses. However, the present disclosure is not limited to the sequence of the foregoing steps. In other words, the steps may be performed in the sequence mentioned in the embodiments, or performed in the sequence different from that in the embodiments, or a plurality of steps may be performed simultaneously.

The foregoing descriptions are merely specific implementations of the present disclosure. A person skilled in the art can clearly understand that to describe conveniently and concisely, for a specific working process of the system, module, and unit described above, refer to the corresponding process in the foregoing method embodiments. Details are not described herein again. It should be understood that the protection scope of the present disclosure is not limited to this. Any equivalent modification or replacement readily figured out by a person skilled in the art within the technical scope disclosed in the present disclosure shall fall within the protection scope of the present disclosure.

What is claimed is:

1. A measurement method for radio resource management, the method comprising:
   determining, by a terminal, a demodulation reference signal (DMRS) of a physical downlink control channel (PDCCH) used for radio resource management (RRM) measurement; and performing, by the terminal, RRM measurement according to the DMRS; wherein
the DMRS used for the RRM measurement is determined according to higher layer signaling; and the method further comprises:
determining, according to the higher layer signaling, whether the terminal is allowed to perform the RRM measurement according to the DMRS of the PDCCH;
wherein the higher layer signaling comprises an indication of a synchronization signal block measurement timing configuration (SMTC) used for RRM measurement, and the DMRS for performing the RRM measurement comprises: a DMRS of a PDCCH associated with a synchronization signal block (SSB) comprised in a time window indicated by the SMTC; and/or
the higher layer signaling comprises an indication of the SSB actually transmitted in the serving cell, and the DMRS for performing the RRM measurement comprises: a DMRS of a PDCCH associated with the SSB actually transmitted in the serving cell.

2. The method according to claim 1, further comprising:
performing, by the terminal, RRM measurement according to the SSB; and
obtaining, by the terminal, a to-be-reported RRM measurement result according to two RRM measurement results, wherein the two RRM measurement results are: a measurement result obtained by performing RRM measurement according to the DMRS and a measurement result obtained by performing RRM measurement according to the SSB.

3. The method according to claim 2, wherein
calculating, by the terminal, the to-be-reported RRM measurement result according to a ratio between power of the SSB and power of a resource element (RE) of the DMRS and the two RRM measurement results.

4. The method according to claim 2, wherein
the SSB comprises: an SSB comprised in a time window indicated by the SMTC or an SSB actually transmitted in a serving cell; or
the SSB comprises: a union set of an SSB comprised in the time window indicated by the SMTC and an SSB actually transmitted in a serving cell; or
the SSB comprises: an intersection set of an SSB comprised in a time window indicated by an SMTC and an SSB actually transmitted in a serving cell.

5. The method according to claim 2, wherein
the DMRS for performing the RRM measurement and the SSB for performing the RRM measurement are quasi-co-located (QCL).

6. The method according to claim 1, wherein
the DMRS for performing the RRM measurement comprises: a DMRS of a paging PDCCH monitored by the terminal and/or a DMRS of a PDCCH for scheduling system information; or
the DMRS for performing the RRM measurement comprises: a DMRS of a PDCCH that higher layer signaling instructs to monitor.

7. The method according to claim 1, wherein
it is determined whether a DMRS for monitoring a PDCCH in a control resource set (CORESET) is a wideband DMRS according to the higher layer signaling; and
the wideband DMRS is used as the DMRS for performing the RRM measurement.

8. The method according to claim 1, wherein the RRM measurement is used for at least one of intra-frequency measurement, inter-frequency measurement, inter-RAT measurement, serving cell measurement, or camped cell measurement.

9. A terminal, comprising: a processor and a memory storing computer program instructions; wherein
the computer program instructions, when executed by the processor, cause the terminal to perform:
determining a demodulation reference signal (DMRS) of a physical downlink control channel (PDCCH) used for radio resource management (RRM) measurement; and
performing RRM measurement according to the DMRS; wherein
the DMRS used for the RRM measurement is determined according to higher layer signaling; and the computer program instructions, when executed by the processor, cause the terminal to further perform:
determining, according to the higher layer signaling, whether the terminal is allowed to perform the RRM measurement according to the DMRS of the PDCCH;
wherein the higher layer signaling comprises an indication of a synchronization signal block measurement timing configuration SMTC used for RRM measurement, and the DMRS for performing the RRM measurement comprises: a DMRS of a PDCCH associated with a synchronization signal block (SSB) comprised in a time window indicated by the SMTC, and/or
the higher layer signaling comprises an indication of the SSB actually transmitted in the serving cell, and the DMRS for performing the RRM measurement comprises: a DMRS of a PDCCH associated with the SSB actually transmitted in the serving cell.

10. The terminal according to claim 9, wherein the computer program instructions, when executed by the processor, cause the terminal to further perform:
performing RRM measurement according to the SSB; a synchronization signal block (SSB); and
obtaining a to-be-reported RRM measurement result according to two RRM measurement results; wherein the two RRM measurement results are: a measurement result obtained by performing RRM measurement according to the DMRS and a measurement result obtained by performing RRM measurement according to the SSB.

11. The terminal according to claim 10, wherein the computer program instructions, when executed by the processor, cause the terminal to further perform:
calculating the to-be-reported RRM measurement result according to a ratio between power of the SSB and power of a resource element (RE) of the DMRS and the two RRM measurement results.

12. The terminal according to claim 10, wherein
the SSB comprises: an SSB comprised in the time window indicated by the SMTC or an SSB actually transmitted in a serving cell; or
the SSB comprises: a union set of an SSB comprised in the time window indicated by the SMTC and the SSB actually transmitted in a serving cell; or
the SSB comprises: an intersection set of an SSB comprised in the time window indicated by the SMTC and the SSB actually transmitted in a serving cell.

13. The terminal according to claim 10, wherein
the DMRS for performing the RRM measurement and the SSB for performing the RRM measurement are quasi-co-located (QCL).

14. The terminal according to claim 9, wherein the DMRS for performing the RRM measurement comprises: a DMRS of a paging PDCCH monitored by the terminal and/or a DMRS of a PDCCH for scheduling system information; or the DMRS for performing the RRM measurement comprises: a DMRS of a PDCCH that higher layer signaling instructs to monitor.

15. The terminal according to claim 9, wherein the RRM measurement is used for at least one of intra-frequency measurement, inter-frequency measurement, inter-RAT measurement, serving cell measurement, or camped cell measurement.

16. The terminal according to claim 9, wherein it is determined whether a DMRS for monitoring a PDCCH in a control resource set (CORESET) is a wideband DMRS according to the higher layer signaling; and the wideband DMRS is used as the DMRS for performing the RRM measurement.

17. A network device, comprising: a processor and a memory storing computer program instructions; wherein the computer program instructions, when executed by the processor, cause the network device to perform:

indicating a demodulation reference signal (DMRS) of a physical downlink control channel (PDCCH) used for radio resource management (RRM) measurement by a terminal; wherein the DMRS used for the RRM measurement is indicated by using higher layer signaling; and the method further comprises:

indicating, by using the higher layer signaling, whether to allow the terminal to perform the RRM measurement according to the DMRS of the PDCCH;

wherein the higher layer signaling comprises an indication of a synchronization signal block measurement timing configuration (SMTC) used for RRM measurement, and the DMRS for performing the RRM measurement comprises: a DMRS of a PDCCH associated with a synchronization signal block (SSB) comprised in a time window indicated by the SMTC; and/or the higher layer signaling comprises an indication of the SSB actually transmitted in the serving cell, and the DMRS for performing the RRM measurement comprises: a DMRS of a PDCCH associated with the SSB actually transmitted in the serving cell.

* * * * *